(12) United States Patent
Anhut et al.

(10) Patent No.: US 12,204,082 B2
(45) Date of Patent: Jan. 21, 2025

(54) LIGHT MICROSCOPE WITH RECONFIGURABLE SENSOR ARRAY

(71) Applicants: Carl Zeiss Microscopy GmbH, Jena (DE); Ecole Polytechnique Federale de Lausanne, Lausanne (CH)

(72) Inventors: Tiemo Anhut, Jena (DE); Daniel Schwedt, Jena (DE); Ivan Michel Antolovic, Lausanne (CH); Claudio Bruschini, Villars-sous-Yens (CH); Edoardo Charbon, Jouxtens-Mezery (CH)

(73) Assignees: Carl Zeiss Microscopy GmbH, Jena (DE); Ecole Polytechnique Federale de Lausanne, Lausanne (CH)

( * ) Notice: Subject to any disclaimer, the term of this patent is extended or adjusted under 35 U.S.C. 154(b) by 592 days.

(21) Appl. No.: 17/602,086

(22) PCT Filed: Apr. 9, 2019

(86) PCT No.: PCT/EP2019/058991
§ 371 (c)(1),
(2) Date: Oct. 7, 2021

(87) PCT Pub. No.: WO2020/207571
PCT Pub. Date: Oct. 15, 2020

(65) Prior Publication Data
US 2022/0206275 A1    Jun. 30, 2022

(51) Int. Cl.
*G02B 21/00*    (2006.01)
*G01J 1/44*    (2006.01)
(Continued)

(52) U.S. Cl.
CPC .............. *G02B 21/008* (2013.01); *G01J 1/44* (2013.01); *G01N 21/6458* (2013.01);
(Continued)

(58) Field of Classification Search
CPC .............. G02B 21/008; G02B 21/0032; G02B 21/0036; G02B 21/0076; G02B 21/02;
(Continued)

(56) References Cited

U.S. PATENT DOCUMENTS 5,949,483 A    9/1999 Fossum et al.
6,137,584 A    10/2000 Seidel et al.
(Continued)

FOREIGN PATENT DOCUMENTS

DE    10201301934.7 A1    2/2015
JP    2001-509255 A    7/2001
(Continued)

OTHER PUBLICATIONS

Sheppard, C.J.R., et al.; "Super-resolution in Confocal Imaging"; Optik 1988; 80(2):53-54.
(Continued)

*Primary Examiner* — Georgia Y Epps
*Assistant Examiner* — Don J Williams
(74) *Attorney, Agent, or Firm* — Duane Morris LLP

(57) ABSTRACT

A light microscope has a light source for illuminating a specimen, a sensor array comprised of photon-counting detector elements for measuring detection light coming from the specimen, and a control device for controlling the sensor array. The control device is configured for flexibly binning the photon-counting detector elements into one or more super-pixels.

20 Claims, 6 Drawing Sheets

(51) Int. Cl.
  *G01N 21/64* (2006.01)
  *G02B 21/02* (2006.01)
  *G02B 21/08* (2006.01)
(52) U.S. Cl.
  CPC ..... *G02B 21/0032* (2013.01); *G02B 21/0036* (2013.01); *G02B 21/0076* (2013.01); *G02B 21/02* (2013.01); *G02B 21/082* (2013.01); *G01J 2001/442* (2013.01)
(58) Field of Classification Search
  CPC ............. G02B 21/082; G01J 2001/442; G01N 21/6458
  See application file for complete search history.

(56) References Cited

U.S. PATENT DOCUMENTS

| | | | |
|---|---|---|---|
| 8,982,206 | B2 | 3/2015 | Raicu et al. |
| 2004/0207731 | A1 | 10/2004 | Bearman et al. |
| 2005/0057749 | A1 | 3/2005 | Dietz et al. |
| 2012/0162754 | A1 | 6/2012 | Liedtke |
| 2013/0300838 | A1 | 11/2013 | Borowski |
| 2015/0362715 | A1 | 12/2015 | Kubo |
| 2016/0131883 | A1 | 5/2016 | Kleppe et al. |
| 2017/0176250 | A1 | 6/2017 | Rae et al. |
| 2018/0039053 | A1 | 2/2018 | Kremer et al. |
| 2019/0098284 | A1* | 3/2019 | Kovacovsky ........... G01S 7/493 |
| 2019/0258042 | A1 | 8/2019 | Kleppe et al. |
| 2021/0165083 | A1* | 6/2021 | Fine ........................ G01S 17/18 |

FOREIGN PATENT DOCUMENTS

| | | |
|---|---|---|
| JP | 2002-523731 A | 7/2002 |
| JP | 2012-133368 A | 7/2012 |
| JP | 2014-170045 A | 9/2014 |
| JP | 2016-001227 A | 1/2016 |
| JP | 2016-528557 A | 9/2016 |
| JP | 2018-509760 A | 4/2018 |
| WO | 0011024 A2 | 3/2000 |

OTHER PUBLICATIONS

Sheppard, C.J.R., et al.; "Superresolution by image scanning microscopy using pixel reassignment"; Optics Letters 2013; 38(15):2889-2892.

Antolovic, Ivan Michel, et al.; "Dynamic range extension for photon counting arrays"; Optics Express 2018; 26(17):22234-22248.

International Search Report dated Dec. 2, 2019 for PCT/EP2019/058991.

JP Office Action dated Dec. 13, 2022 issued in co-pending JP Application No. 2021-552205.

Nov. 20, 2023 First Notice of Examination Action (PCT Application Entering the National Phase) issued by the China State Intellectual Property Office for Chinese Patent Application No. 201980094729.0. [English translation included.].

Aug. 1, 2023 Decision of Rejection issued by the Japanese Patent Office for Japanese Patent Application No. 2021-552205. [English translation included.].

* cited by examiner

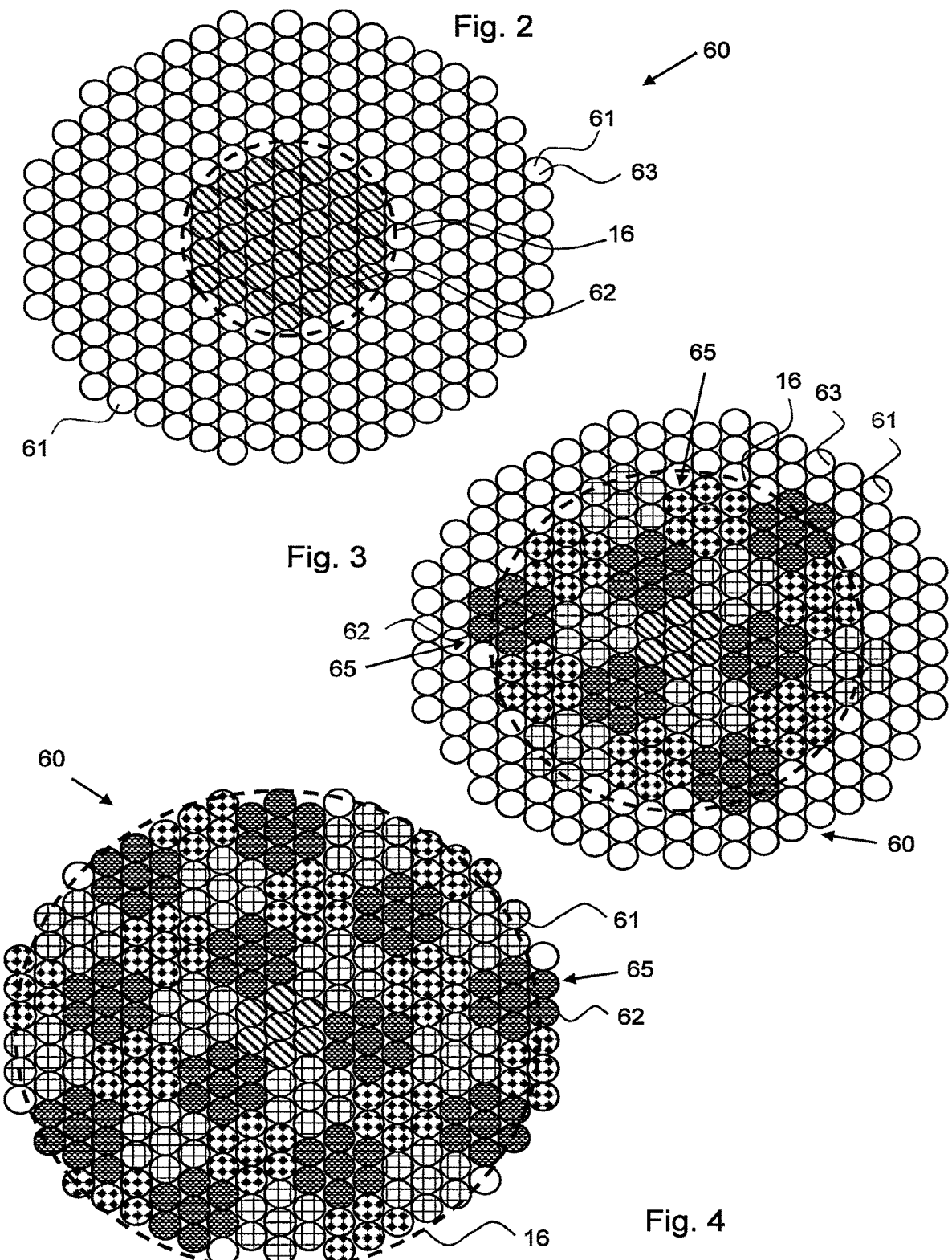

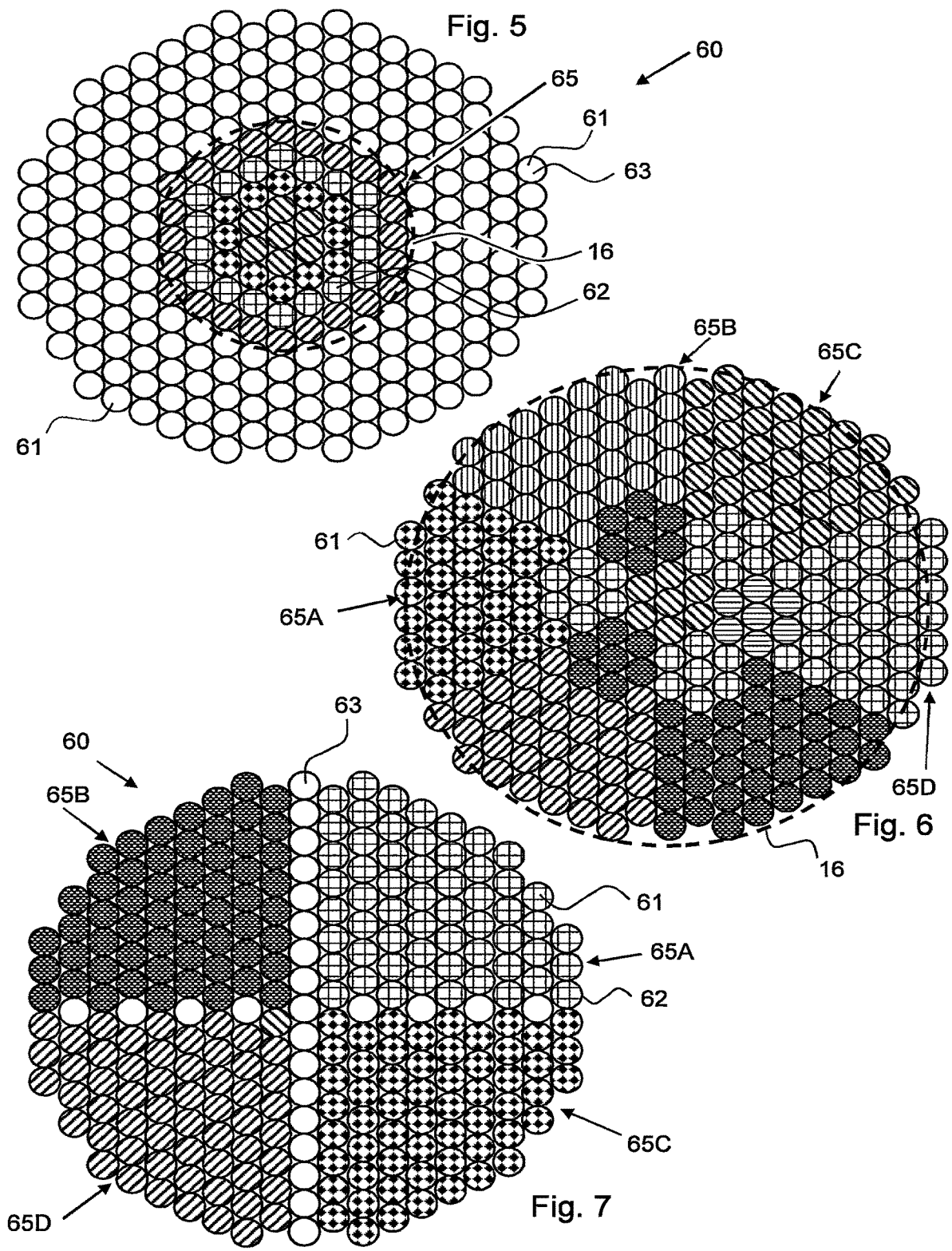

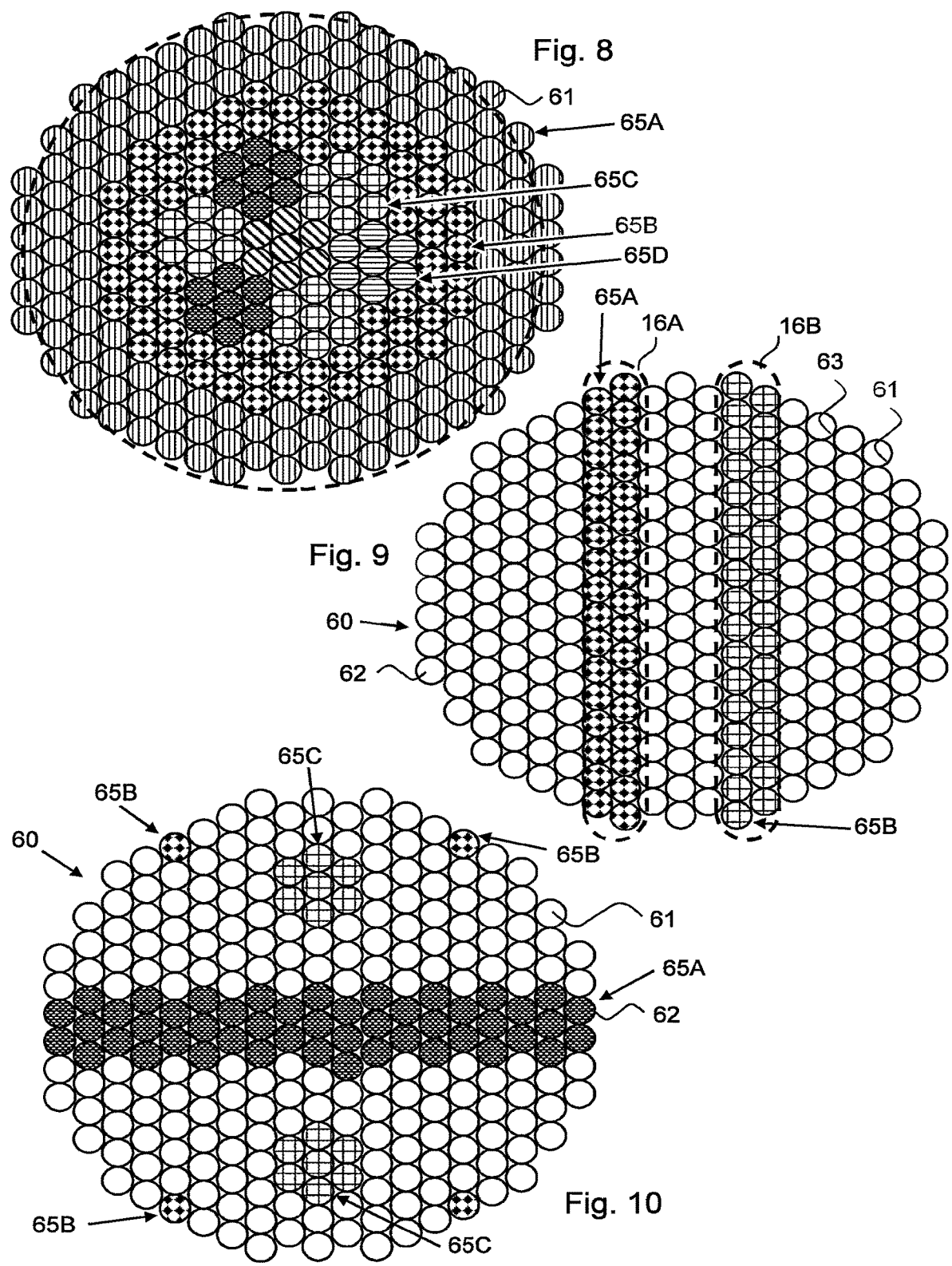

LIGHT MICROSCOPE WITH RECONFIGURABLE SENSOR ARRAY

RELATED APPLICATIONS

The present application is a U.S. National Stage application of International PCT Application No. PCT/EP2019/058991 filed on Apr. 9, 2019, the contents of which are incorporated by reference in their entirety.

FIELD OF THE DISCLOSURE

The present disclosure relates to a light microscope, a light detector, and an imaging method according to the annexed claims.

BACKGROUND OF THE DISCLOSURE

Light microscopes are used in a wide variety of applications such as life sciences or material testing. In particular, confocal scanning microscopy is a well-established technique. Current sensor technologies employed in confocal scanning microscopes comprise photomultiplier tubes with multialkali or GaAsP photocathodes, or hybrid detectors comprising a GaAsP photocathode and an APD (avalanche photodiode) detector.

Recent advances see the use of single photon avalanche diodes (SPADs) which offer a high sensitivity, fast response times and low dark counts. SPAD arrays allow spatial sampling of the point spread function (PSF) which may be used in image scanning techniques (Airyscan) based on work by Sheppard et al., cf. Sheppard, C. J. *Optik* 80, 53-54 (1988); and Sheppard, C. J., Mehta, S. B. & Heintzmann, R. *Opt. Lett.* 38, 2889-2892 (2013). In certain applications, the PSF is rotationally symmetric but generally any light distribution may be used.

A photon-counting detector element or SPAD comprises a junction with a depletion region lacking any free electric charge carriers. A voltage $V_{OP}$ above the breakdown voltage is applied at the junction. A photon absorbed by the SPAD may be able to inject a carrier in the depletion region and as a consequence, impact ionization may cause an avalanche of carriers that will spread to further regions of the diode and can be detected as a photon count.

To detect a following photon, the avalanche is quenched. When the diode is quenched (i.e., there is no further current due to impact ionization and no free carriers in the diode), the voltage at the diode will be recharged by a flow of electric current through e.g. a quenching resistor, and the diode is ready to detect another carrier.

A generic light microscope comprises a light source for illuminating a specimen and a sensor array comprised of photon-counting detector elements for measuring detection light coming from the specimen. A control device is configured for controlling the sensor array. Optical elements may be arranged for guiding illumination light from the light source to the specimen and for guiding detection light from the specimen to the sensor array. Similarly, a generic a light detector comprises a sensor array comprised of photon-counting detector elements, and a control device for controlling the sensor array. A generic imaging method comprises the steps of illuminating a specimen with illumination light, measuring detection light coming from the specimen with a sensor array comprising photon-counting detector elements, and controlling the sensor array with a control device.

US 2016/0131883 A1 describes a laser scanning microscope with a plurality of avalanche photodiodes or PMTs. Optical fibers are used to lead detection light to the individual photodiodes. The PSF is spatially resolved and thus allows to carry out the above-referenced image scan technique. As a consequence of the rather low number of photodiodes and the optical fibers used to guide light to the photodiodes, zoom optics are generally used to adapt the size of the PSF to the limited number of optical fibers and sensor pixels. The required zoom optics for adapting the PSF size are rather complex and thus increase costs while potentially negatively affecting signal detection efficiency because of the large number of required optical elements.

US 2017/0176250 A1 describes a sensor array with SPAD elements, in particular for distance measurements. In this case, the output lines of all SPAD elements of the sensor array are combined into a single output. The sensor array thus outputs a detection signal each time any one of the SPAD elements measures an impinging photon. This design offers accurate results for certain applications but its binning of output lines into a single output does not allow to use this sensor array in many microscopy techniques such as the above-described PSF oversampling technique.

It is an object of the invention to provide a light microscope, a light detector and an imaging method which offer a particularly high image quality without unduly high optical complexity and costs.

SUMMARY OF THE DISCLOSURE

The above-defined object is reached with a light microscope having the features as defined in the annexed claims. Preferred embodiments are given in the dependent claims as well as in the following description, in particular in connection with the attached figures.

According to the invention, the light microscope of the above-mentioned kind and the light detector of the above-referenced kind are characterized in that the control device is configured for flexibly binning the photon-counting detector elements into one or more super-pixels.

The above-mentioned method is, according to the invention, characterized at least by the step of flexibly binning the photon-counting detector elements into one or more super-pixels. The method may in particular be implemented using the embodiments of the light microscope of the invention described herein.

Preferred embodiments described below, which in particular describe the sensor array, the control device, optical elements or a light source, may apply to both the light microscope and the light detector of the invention.

Conventionally, complex zoom optics are used to adjust the size of a light beam impinging on the sensor array such that the light beam sufficiently fills the sensor array. In contrast, the invention allows to adjust the sensor array to the size and characteristics of the impinging light spot. In the case of a PSF oversampling mode, the size of the light beam (or light spot) impinging on the sensor array is defined by the PSF. Spatially resolving the PSF allows to gain information required for high resolution techniques. A sufficient number of detection points is required for spatially resolving the PSF, while an unnecessary large number of detection points would exceed reasonable constraints on the data rate Binning the output lines of photon-counting detector elements flexibly into a variable number of super-pixels overcomes such issues. The larger the PSF (light spot impinging on the detector array), the larger the super-pixels may be set. In case of a smaller light spot, the detector elements onto which the light impinges may be grouped into smaller super-pixels (or some detector elements may also not be binned into any super-pixels) whereas other detector elements onto which lower intensities of light or no light impinges, are either binned into larger super-pixels or are deactivated. The inventive concept allows precise measurements of light distributions while the requirements for zoom optics (e.g., the zoom factor) are lowered. Simultaneously, the inventive concept may offer advantages in the maximum count rate and the signal-to-noise ratio (SNR).

In particular based on CMOS SPAD technology, each detector element can be addressed individually and the sensor array may be reconfigurable to enable combining (binning) every individual pixel (i.e., output from photon-counting detector elements) into any super-pixel. The binning is hence in principle independent of the detector element position. The control device may thus be configured for flexibly binning contiguous (neighboring) and/or non-contiguous photon-counting detector elements into the same super-pixel.

In a preferred embodiment, event-driven active recharge is used for the photon-counting detector elements. The corresponding event-driven active recharge (electronic) components may be considered as part of the control device and/or the sensor array. Event-driven active recharge allows to individually recharge each detector element, i.e., not all detector elements are recharged at the same time but instead only specific detector elements that experience an avalanche event. This yields a "non-paralyzable" sensor response to light and offers a dynamic range extension compared to passively and clock-driven recharged SPADs. Further explanations are given in "Dynamic range extension for photon counting arrays" by Ivan Michel Antolovic et al., published in Vol. 26, No. 17, OPTICS EXPRESS 22234 of 20 Aug. 2018.

Further advantages are achieved if the flexibility in the reconfigurable sensor array does not only concern the binning, but also the activation of individual detector elements. "Active" or "activated" is here understood to indicate that the detector element outputs a measurement signal (photon count rate) that is further processed, whereas a deactivated detector element does not output a measurement signal that is further used. Alternatively, "deactivated" may indicate a detector element that is not routed such that its output is further processed. In case of low light intensities impinging on some detector elements, activating those detector elements may indeed deteriorate the total SNR because of dark noise. In this case deactivating the concerned detector elements may be preferable to combining them into one or more large super-pixels. In case of low detection light powers, it may thus be preferable to concentrate the detection light on a smaller spot and activate only the respective detector elements. With increasing intensity, the accuracy may be improved by increasing the spot size and accordingly increasing the active area. In other words, the control device may be configured to control optical elements to decrease a detection light spot size on the sensor array and to decrease the active area with decreasing detection light power. With increasing detection light power, more detector elements may be activated, which increases the maximum count rate, and the SNR through higher photon fluxes.

A super-pixel is commonly understood as a combination of the outputs of one or more (or two or more) detector elements. For shorter language, the present disclosure refers frequently to binning into super-pixels which shall cover the option that all detector elements are binned into super-pixels but may also comprise the option that some (active) detector elements are not binned.

The control device may be configured to assign a respective multi-bit counter to each super-pixel. Multi-bit counters reduce the data rate compared with individually transmitting measurement data from each detector element. Each multi-bit counter outputs a cumulative number indicative of the counted photons by all detector elements binned into the respective super-pixel. The data rate may thus be reduced from X [bits/second] to $X \cdot N/(2^N-1)$ [bits/second], where X indicates the super-pixel detection rate and N the number of bits of the multi-bit counter.

The control device (or parts of the control device) and the sensor array may be built on the same circuit board and/or in the same IC (integrated circuit). In particular, parts of the described control device may be built together with the sensory array in the same IC whereas other parts of the control device are formed outside the IC but on the same circuit board as the IC. For example, the multi-bit counters may be formed as on-chip multi-bit counters. Each photon-counting detector element may be connected via a respective signal line to the control device (i.e., to a multi-bit counter or a pre-processing unit prior to reaching the multi-bit counter). This reduces the maximum necessary data bandwidth out of the control device.

The control device may variably set the number of super-pixels and/or may variably set the number of pixels binned into one super-pixel. Different simultaneously used super-pixels may also vary in their size.

Exemplary electronic implementations of the control device are described in the following. The control device may be configured to flexibly set a number of up to M super-pixels to which end the control device comprises a processing unit with the same number of M units. Each detector element is connected with each unit. If the number of detector elements is N, each unit may thus have N input lines each of which receives a photon count rate of one detector element. (More generally, each unit may be connected with at least several but not necessarily all of the detector elements.) Each unit comprises a plurality of switches (in particular one switch for each detector element) to flexibly control whether a photon count rate output by a specific detector element is forwarded through the switch or blocked. Each unit comprises a combination circuit with which the switches connect. Depending on the state of the switches, it is thus possible to flexibly control which detector elements are connected to the same combination circuit. Each combination circuit outputs a data stream indicative of all photon count rates of those detector elements for which the respective switches leading to this combination circuit are closed.

Each switch may be controlled through a memory, in particular a respective 1-bit memory, wherein the two possible states of the memory define whether the switch is to be closed or opened.

The control device may further comprise a super-pixel counter unit with a plurality of independent multi-bit counters. Each combination circuit is connected with at least one of the multi-bit counters. A multi-bit counter thus outputs a number corresponding to the photon count rates of all detector elements connected to the respective combination circuit. In a further variant, each combination circuit connects to a pair of multi-bit counters. The total number of multi-bit counters may thus be at least 2 M if there are M combination circuits. A pair of multi-bit counters operate in alternating phases, i.e., while one of these multi-bit counters counts the incoming photon count rates from the combination circuit, the other multi-bit counter is read out, and vice versa. In this way, time delays due to the read-out are reduced or avoided.

To provide up to M super-pixels, the control device may thus comprise a number of M independent combination circuits and at least a number of M (preferably 2 M) multi-bit counters. If N indicates the number of detector elements, each combination circuit comprises up to N programmable switches connected with the detector elements. M is smaller than the number of programmable switches and smaller than N. The total number of programmable switches and associated 1-bit memories may thus be N·M. In operation, a number of less than M super-pixels may be desired in which case a correspondingly reduced number of multi-bit counters are read out.

The control device may set the binning and/or an active area of the sensor array, i.e., individually activate and deactivate each detector element, according to light spot size information. The light spot size information may in general be any information or assumption indicative of an expected light distribution or size on the sensor array. The information may be based on prior measurements or reference measurement. Additionally or alternatively, the light spot size information may (at least partially) be derived from a currently used illumination wavelength and/or a currently used objective. The illumination wavelength affects the PSF size, which may in particular increase with increasing illumination wavelength. Detailed explanations how the active area and the binning are set dependent on the PSF size (and hence dependent on the wavelength) are given further below. The PSF size is also affected by the back aperture diameter of the objective. The smaller the back aperture diameter, the larger the PSF size. In some embodiments, the active area of the sensor array is increased and/or the (average) number of detector elements per super-pixel is increased with increasing illumination wavelength and/or when the objective is changed to an objective with smaller back aperture diameter, and vice versa, i.e. the active area and/or the average number of detector elements per super-pixel is decreased with decreasing wavelength and/or when the objective is changed to an objective with a larger back aperture diameter. As the wavelength as well as the back aperture diameter affect the PSF size, it may be advantageous to adjust the active area and the super-pixels dependent on these factors. Additionally or alternatively, the active area and/or the average number of detector elements per super-pixel may be set depending on a numerical aperture with which a specimen part is imaged onto the sensor array. Also the numerical aperture affects the detection light spot size on the sensor array. By adjusting the average number of detector elements combined in the same super-pixel, the transmitted data stream is kept manageable, in particular constant, as explained further below.

The control device may be configured to offer a plurality of imaging modes to a user. A user may select one of the imaging modes, e.g., via a computer. The imaging modes comprise at least two of: a PSF oversampling mode, a line (or array) scanning mode, a field imaging mode and a confocal detection mode, as described in the following. The binning and optionally the active sensor area are set depending on a selected imaging mode. Also optical elements are adjusted depending on the imaging mode, as described further below.

PSF Oversampling Mode (Image Scan Mode)

The control device may be configured to perform a PSF oversampling mode (also referred to as an image scan mode). Illumination light is focused onto a specimen point and detection light emanating from the specimen point (e.g., fluorescence light) is focused onto the sensor array, which is arranged in a conjugate plane to the illuminated specimen plane. A pinhole may be arranged in a pupil plane. The detection light forms a detection light spot on the sensor array. The size and intensity distribution of the light spot is representative of the PSF. A diameter of the light spot may be understood as 1 Airy disc diameter. In the PSF oversampling mode, the super-pixels may be set such that a center-to-center distance between adjacent super-pixels is at most 0.2 Airy disc diameters. This ensures a sufficient number of detection points for spatially resolving the PSF. Also the active area of the sensor array is set in dependence of a PSF size. In some embodiments, the active sensor area is increased with increasing PSF size. In particular, the active area may be set to a size or diameter that is (within a 10% or 20% margin) equal to the PSF size (i.e., the size of the PSF or light spot on the sensor array). Additionally or alternatively, the number of super-pixels may be set in dependence of the PSF size. The number of photon-counting detector elements binned into the same super-pixel may also be set dependent on the PSF size. With increasing PSF size, the number of detector elements combined into the same super-pixel may be increased, in particular to avoid excessively high data rates. The number of combined detector elements may be adjusted such that a data rate output by the control device (i.e., the data comprising the acquired measurement data of the super-pixels) does not exceed a predefined maximum rate and/or is constant, i.e., either exactly constant or constant within a predefined range of e.g. 10% or 20%. This ensures a sufficient number of data points for sampling/spatially resolving the PSF, while avoiding excessive data rates. The number of detector elements to be combined into the same super-pixel may also be set in dependence of a desired maximum count rate. The larger the desired maximum count rate, the more detector elements are to be combined into the same super-pixel. If a lower limit for the count rate is not considered, the maximum count rate may be regarded as a dynamic range of the sensor. However, as the dark count rate may define a lower limit for a photon count rate of an individual detector element, combining several detector elements leads to an increase in the minimum count rate and may thus not increase the dynamic range, while it still increases the maximum count rate.

The simultaneously used super-pixels may vary in size and shape. If the PSF has (or is expected to have) its maximum at its center, one or more central super-pixel(s) may be smaller than outer super-pixels.

Line Scanning Mode and Array Scanning Mode

The control device may also be configured to perform a line scanning mode (or more general: array scanning mode). In the line scanning mode, the specimen is illuminated with an elongated illumination light spot, e.g., by using a cylindrical lens to focus illumination light onto the specimen. This illumination leads to an elongated detection light spot on the sensor array. The control device bins photon-counting detector elements together such that elongated super-pixels are formed in a direction transverse or perpendicular to the elongated detection light spot. For example, if the elongated detection light spot forms a column on the sensor array, then detector elements of one or more rows are binned into the same super-pixel (wherein rows and columns are perpendicular to each other). Detector elements which are not illuminated with the elongated detection light spot may be deactivated. The binning patterns used for the line scanning mode thus vary significantly from binning patterns used in the PSF oversampling mode.

In the line scanning mode, the elongated illumination light beam is scanned over the specimen, wherein a scanning direction is transverse or perpendicular to the longitudinal direction of the elongated illumination light spot. Several measurements are consecutively recorded with the sensor array during this scan, and a specimen image is calculated from these measurements.

In principle, also other illumination shapes than an elongated illumination light spot may be used while offering similar advantages to the line scanning mode with regard to reduced scanning time and image acquisition time. Such array scanning modes use an illumination light pattern other than a dot or line. For example, a grid or a plurality of lines may be used as an illumination light pattern which is then scanned over the specimen.

In an array scanning mode, a plurality of illumination light spots are simultaneously scanned over the specimen. The plurality of illumination light spots may have circular, longitudinal or generally any other shapes.

Field Imaging Mode

A field imaging mode may, for example, be used to record an overview image with a reduced resolution or SNR compared to a specimen image recorded with the other described imaging modes. In the field imaging mode, a wide-field image of the specimen is recorded with the sensor array. Optical elements may thus be removed or inserted into the illumination and/or detection beam path to ensure that not merely a specimen point is illuminated and to ensure that the specimen plane (and not a pupil plane) is imaged onto the sensor array. The active area may span over the whole sensor array or may be set in dependence of a numerical aperture or a zoom setting. Binning may be used to reduce the output data rate. In a variant of the field imaging modes, several wide-field images of different specimen parts may be consecutively recorded and then stitched together to form the overview image.

Confocal Detection Mode

The control device may also be configured to perform a confocal detection mode, without PSF oversampling. In the confocal detection mode, illumination light is focused onto a specimen point, and detection light emitted from this specimen point is guided to the sensor array. The same objective is used for focusing illumination light onto the specimen and receiving detection light from the specimen. A pinhole may be arranged in a pupil plane. It may be desirable to measure all the detection light impinging on the detector array as precisely as possible, without spatial resolution being necessary. In this case, all activated photon-counting detector elements may be binned into one super-pixel. One super-pixel suffices as there is no PSF oversampling in this operation mode. Still, using a plurality of photon-counting detector elements (SPADs) and subsequently binning them into one super-pixel has significant advantages over conventional detectors: SPADs are unsurpassed in measuring low light intensities. At higher light powers, a single SPAD may saturate; during its dead time (when its voltage after a photon detection has not yet recovered to exceed the breakdown voltage of the diode), the single SPAD is not able to detect another photon. However, by using a sensor array with a plurality of SPADs, the maximum count rate can be increased. Hence, a SPAD array can offer increased accuracy without major drawbacks in the dynamic range or maximum count rate.

Adjustment of Optical Elements

The control device may also be configured to adjust optical elements, e.g., lenses and mirrors, dependent on the selected imaging mode. In the confocal detection mode, optical elements may be adjusted, e.g., moved or deformed, to homogenize an intensity distribution on the sensor array. In particular, optical elements may be brought into a beam path of the detection light for imaging a pupil onto the sensor array. Furthermore, optical elements may be adjusted or moved to adjust a size of the detection light spot on the sensor array. The optical system is thus configured to switch between a specimen plane imaging and a pupil imaging onto the same sensor array. A pupil image may have a more uniform intensity distribution than a specimen image (e.g., in the case that merely a specimen point is illuminated). Therefore it may be preferable to image a pupil onto the sensor array. A uniform intensity distribution without excessive intensity peaks on an individual detector element is of greater relevance, compared with conventional setups, because a SPAD array is used. If the impinging light power is rather high, the pupil image should homogeneously fill the sensor area to optimize SNR. If the light power of the impinging detection light is rather low, it may be preferable to concentrate the light on a smaller number of detection elements, thus increasing the intensity on the illuminated detection elements. Otherwise, the weak signal strength would be overshadowed by dark noise of the detector elements. Hence, at least within a certain power range of the detection light, the control device may adjust the detection light spot size on the sensor array such that the spot size increases with increasing beam power. The active area of the sensor array is adjusted in correspondence with this spot size adjustment.

In the confocal imaging mode and/or the PSF oversampling imaging mode, the adjustment of the detection light spot size may also be carried out to avoid saturation of the detector elements or the increase the SNR. If the intensity on a detector element surpasses a predefined threshold (e.g., above which an output photon count rate is not linear proportional to the impinging intensity), the detection light spot size may be increased which in turn reduces the impinging light power per detector element.

To adjust the size of the detection light spot (or the pupil image), an imaging lens may be adjusted which focuses the detection light in the vicinity of the sensor array. For example, the imaging lens may be moved to shift the focal plane relative to the sensor array. The farther the sensor array is out of focus, the larger the detection light spot becomes. Depending on the imaging lens design, the imaging lens may also be adjusted by deformation or in other ways, instead of being moved, e.g., in case of an adaptive liquid lens.

In contrast to the confocal imaging mode, in the PSF oversampling mode optical elements are adjusted to image a specimen point onto the sensor array to record spatial information on a PSF. Hence, a change from the confocal detection mode to the PSF oversampling mode may imply a change from a pupil imaging to a specimen plane imaging onto the sensor array. Such a change may be affected by inserting or removing a Bertrand lens into/out of a beam path of the detection light, e.g., by moving the Bertrand lens or redirecting the detection light to the Bertrand lens. Alternatively, a phase mask for setting a phase distribution or an SLM (spatial light modulator) may be arranged in an illumination or detection pupil plane. An SLM may in particular be formed by an array of adjustable micro lenses, diffractive optical elements, adjustable mirrors such as a digital micromirror device, or a controllable liquid crystal array. The SLM may similarly adjust the spot size and/or intensity distribution.

Also optical elements in the illumination beam path may be adjusted or inserted depending on the selected imaging mode. For example, in the PSF oversampling mode or the confocal imaging mode, the illumination light shall be focused onto a specimen point whereas the wide-field imaging mode requires a larger specimen area to be illuminated, and the line scanning mode may require introduction of a cylindrical lens.

Adjustments for FLIM

The inventive microscope is also well-suited for FLIM (Fluorescence Lifetime Imaging Microscopy). SPADs offer a high time resolution favourable for FLIM measurements. For determining the fluorescence life time, fluorophores are stimulated with repetitive light pulses. After each pulse, the time span until photons reach the sensor array is determined. A histogram of photon arrival times is thus produced, from which the fluorescence life time is derived. It would be beneficial to use high intensity pulses to measure a larger number of photons and reduce the required measurement time. However, with increasing intensities, a second photon may reach a SPAD shortly after the same SPAD has registered a first photon. Detection of the first photon entails a dead time in which the second photon cannot be noticed by the SPAD. Hence, the histogram of photon arrival times will be skewed or biased towards shorter times, known as the pile-up effect. This drawback can be avoided with the inventive microscope by homogenizing the intensity distribution and increasing the light spot diameter on the sensor array. These measures reduce the probability that a second photon impinges on a SPAD during its dead time. The control device may be configured to offer FLIM as a further imaging mode in which, with increasing detection light intensity, the detection light spot size is increased and optionally a pupil imaging is effected to homogenize the intensity distribution. Super-pixels may be connected to time-to-digital converters to detect multiple photons per laser period.

Further Embodiments

The control device may be configured to prompt a user to enter an imaging parameter, in particular a desired resolution, frame rate and/or SNR. Depending on an input by the user, the control device will then adjust the binning and active area of the sensor array, and optionally optical elements as described above. In particular, the binning and active area may be set to limit a resulting data rate depending on the desired frame rate. As the bandwidth for transmitting data from the control device is known, the desired frame rate can be translated into an upper limit on the data rate output from the control device. The binning and active area affect the amount of resulting data, and can hence be adjusted to comply with data rate requirements.

A further advantage resides in balancing of spatial resolution and acquisition speed by means of adaptive binning. To benefit from the increased resolution achievable with image scanning microscopy, a certain SNR is needed. If the signal strength (e.g. intensity on the sensor array) is too low, the acquisition rate must be conventionally decreased in order to increase SNR. However, adaptive pixel binning allows to decrease the resolution in favour of the desired acquisition speed. The signal strength may be, for example, a photon count rate, and may stem from a preceding measurement (during a scan of the specimen) or a reference measurement.

The control device may also be configured to keep an output data rate constant (i.e., exactly constant or constant within predefined limits, e.g., 10% or 20%) by adjusting the binning, in particular when an active area of the sensor array is changed. For example, a change in the objective may lead to a change in the size of the detection light spot on the sensor array, and hence the active area may be adjusted to the new light spot size and in turn the binning is adjusted to the new active area size, in particular to keep the data rate constant. The number of super-pixels may be kept constant but different binning pattern may be used. As the number of bits of the multi-bit counters for the super-pixels may vary, there may however also be a change in the number of super-pixels to ensure a constant data rate.

With increasing light intensities, the probability increases that a photon impinges on a detector element during its dead time and hence remains unnoticed. Measurement results from a detector element are thus negatively impacted at very high intensities. To counter this problem, a sensitivity of a detector element may be adjusted, e.g. by adjusting its excess voltage above the breakdown voltage. A light spot impinging on the sensor array has typically not a uniform light distribution. In particular in the PSF oversampling mode, the impinging light spot may have a maximum intensity at its center and a decreasing intensity towards its outer regions. The sensitivity of central detector elements may therefore be set to different levels than the sensitivity of outer detector elements. In particular, different sensitivities may be set between the photon-counting detector elements of the same super-pixel. The sensitivities may be set according to an expected intensity distribution on the sensor array, e.g., based on assumptions about the PSF or based on a reference measurement.

Different lengths of signal lines from the detector elements to the control device may result in timing delays between output data streams of different super-pixels. The control device may be configured to adjust or compensate these timing delays. A calibration matrix may be saved in a storage of the control device and used to this effect.

The control device may comprise a plurality of physical output lines, wherein each output line is associated with a respective super-pixel. The number of output lines may then correspond to the maximum number of super-pixels that can be simultaneously used. As an example, the number of output lines may be between 10% and 40% of the number of detector elements.

It is possible to measure two or more light spots simultaneously on the photon-counting detector array. Different PSF may apply for the different light spots and hence the light spots may have different sizes on the sensor array. The super-pixels for a larger light spot may be set to comprise more detector elements than the super-pixels for a smaller light spot.

A scanner may be provided and configured to scan the specimen with the illumination light and/or to direct the detection light towards the sensor array. The binning may be adjusted during the scan, for example, depending on the amount of light emitted from specific specimen regions. Information acquired during the scan may be used to adjust the binning while the scan continues. In such an on-the-fly adaption, also other parameters may be adjusted, e.g. the sensitivities of the SPADs or the illumination light intensity.

The described light microscope may in particular be formed as a (laser) scanning microscope. Alternatively or additionally, it may be configured as a widefield microscope. The described sensor array and control unit effect the described advantages in many applications where any object is illuminated and detection light coming from the object is measured. The invention may also be applied to other sensor devices which may not necessarily require a microscope, for example in material analysis, camera or surveillance systems, astronomy or production supervision.

A light microscope may be defined by comprising a specimen holder and an objective, in particular an infinity objective which sets the image distance to infinity. It may further comprise a tube with a tube lens arranged in a beam path behind the objective, i.e., between the objective and the detector array, to focus light from the objective into an (intermediate) image plane. In contrast to other optical systems, a light microscope produces at least one intermediate image plane. It may further comprise an illumination port to which the light source can be connected, for example one or more lasers. Detection light emanating from the specimen may be of any kind, e.g., fluorescence or phosphorescence light, illumination light that is scattered or influenced by the specimen through other mechanisms, or light emanating from the specimen for other reasons which may at least partially be caused by the illumination light. In general, specimen light may also be emitted due to effects unrelated to an illumination.

The light microscope may comprise an objective arranged to guide or focus illumination light on the specimen. The objective may in particular also be arranged to receive detection light emanating from the specimen and to guide the detection light towards the sensor array. Generally, also distinct illumination and detection objectives may be used. The light microscope may further comprise a scanner arranged between the objective and the illumination source. The control device controls the scanner to perform a scan of the specimen in which illumination light is scanned over the specimen. Optionally, the scanner may also direct the detection light coming from the objective towards the photon-counting detector array (descanned setup). The scanner may be understood as a device configured to adjustably deflect a light beam. It may comprise one or more movable optical elements such as mirrors, lenses or prisms. Alternatively it may also adjustably deflect the illumination light based on acousto-optical effects.

The PSF may be understood to define how illumination light and detection light are guided by the light microscope or an optical system. In particular, the PSF may be seen as comprised of an illumination PSF and a detection PSF, wherein the illumination PSF defines how a point of the light source is imaged into the specimen plane, and the detection PSF defines how a point from the specimen plane is imaged into the plane of the sensor array. As used herein, a detection spot size on the detector array may also be referred to as a PSF size in the image scan technique or in confocal imaging.

The photon-counting detector elements, for brevity also referred to as "detector elements" may in particular be SPADs (single photon avalanche diodes) which are in particular operated in the so-called Geiger mode. In the Geiger mode, a voltage $V_{OP}$ is applied at the diode of the SPAD which exceeds the breakdown voltage of the diode by an excess bias voltage. As a consequence, a photon absorption may lead to a charge avalanche and thus a countable event. The sensor array may correspondingly be referred to as a SPAD array.

The control device may comprise electronic components such as FPGAs or processing units that may be formed as a single unit or as a distributed system. Functions of the control device may be implemented as software and/or as hardware. The control device or parts thereof may in particular be arranged as on-chip units next to the sensor array. Parts of the control device may also be provided through server or computer applications that communicate with other components of the light microscope through a network In scanning modes, a specimen point may be defined as an illuminated part of the specimen for which the detector elements count photons during a pixel dwell time. After lapse of the pixel dwell time, the scanner illuminates another part of the specimen which is defined as a next specimen point.

For easier intelligibility, the expression "light spot" is frequently used in this disclosure to refer to the light distribution on the specimen or on the sensor array. More generally, the "light spot" may be understood as any light distribution, e.g. a ring pattern, one or more lines or several spots or rings.

The detector of the invention may be used in the light microscope described herein. Alternatively, the detector may be part of other light measurement apparatuses, e.g., for distance measurements, quality control, surveillance, in portable/hand-held devices, in medical devices or as vehicle sensors. Optionally, the detector may be used in combination with the optical elements described herein and a light source for illuminating an object, and the detector may be arranged to measure light coming from this object. The intended use of the different embodiments of the light microscope of the invention results in variants of the method of the invention. Similarly, the light microscope of the invention may be configured to carry out the described exemplary methods of the invention. In particular the control device may be configured to control the sensor array or other components of the light microscope to carry out the method steps described herein.

BRIEF DESCRIPTION OF THE DRAWINGS

A better understanding of the invention and various other features and advantages of the present invention will become readily apparent by the following description in connection with the schematic drawings, which are shown by way of example only, and not limitation, wherein like reference numerals may refer to alike or substantially alike components:

FIG. 2 shows schematically the sensor array of the light microscope of FIG. 1 in a first setting;

FIG. 3 shows schematically the sensor array of the light microscope of FIG. 1 in a second setting using binning;

FIG. 4 shows schematically the sensor array of the light microscope of FIG. 1 in a third setting using binning;

FIG. 5 shows schematically the sensor array of the light microscope of FIG. 1 in a fourth setting using binning;

FIG. 6 shows schematically the sensor array of the light microscope of FIG. 1 in a fifth setting using binning;

FIG. 7 shows schematically the sensor array of the light microscope of FIG. 1 in a sixth setting using binning;

FIG. 8 shows schematically the sensor array of the light microscope of FIG. 1 in a seventh setting using binning;

FIG. 9 shows schematically the sensor array of the light microscope of FIG. 1 in an eight setting using binning;

FIG. 10 shows schematically the sensor array of the light microscope of FIG. 1 in a ninth setting using binning;

DETAILED DESCRIPTION OF EMBODIMENTS

Figure 1:
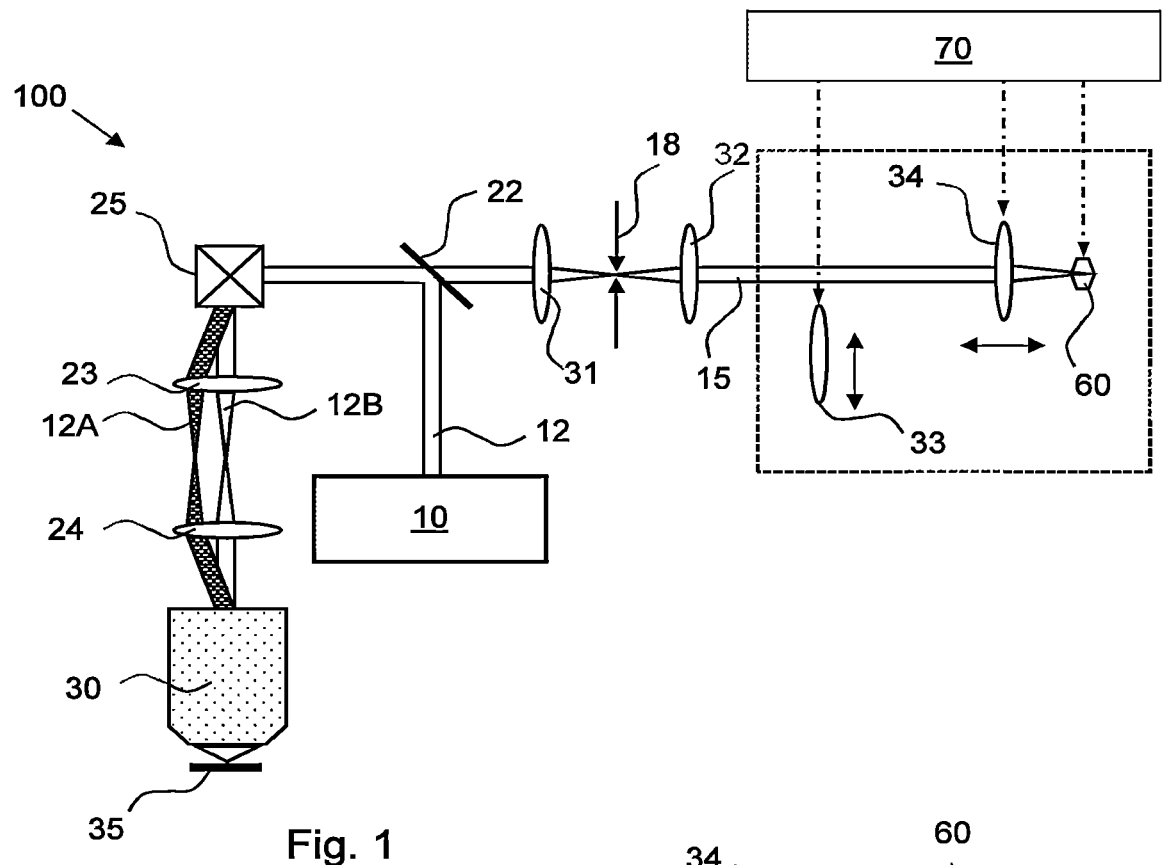
FIG. 1 shows schematically an embodiment of a light microscope according to the invention.

FIG. 1 shows schematically an embodiment of a light microscope 100 of the invention.

The light microscope 100 comprises a light source 10 which emits illumination light 12. The light source 10 may comprise, for example, one or more lasers. The exemplary light microscope 100 is formed as a laser scanning microscope. It comprises a scanner 25 with one or more movable mirrors or other movable optical elements to scan the illumination light 12 over a specimen 35. Optical elements 23, 24, may be used to guide illumination light 12 from the light source 10 via the scanner 25 to an objective 30. The objective 30 focuses the illumination light 12 onto a specimen point, and due to the scanning motion caused by the scanner 25, different specimen points are consecutively illuminated. Two consecutive beam paths of illumination light as set with the scanner 25 are indicated with reference signs 12A and 12B.

The specimen 35 emits detection light 15 which may, for example, be fluorescence or phosphorescence light. The illumination light 12 may be pulsed and may in particular result in a multi-photon excitation of particles in the specimen 35. Detection light 15 is thereby emitted only from a small specimen point and has a different (in particular smaller) wavelength than the illumination light 12.

In the depicted descanned setup, the detection light 15 is guided via the objective 30, the scanner 25 and the optical elements 23, 24 on the same beam path as the illumination light 12. A beam splitter 22 is used for spatially separating the detection light 15 from the illumination light 12. As an example, the beam splitter 22 may be configured to transmit or reflect impinging light depending on its wavelength. The detection light 15 is then guided by further optical elements 31, 32, 33, 34 to a sensor array 60. An optional pinhole 18 for a confocal design may be arranged in an intermediate image plane.

A control device 70 controls the sensor array 60, the optical elements 33 and 34, the light source 10 and the scanner 25, and may also be configured to control further components of the light microscope 100. These components may be jointly referred to as an optical assembly, which is part of the light microscope 100 but may in general also be used in other imaging systems.

An enlarged illustration of the sensor array 60 is shown in each of the FIGS. 2 to 4. Together with the control device, it forms a detector which may be regarded as an independent aspect of the invention that may be implemented in a light microscope or another light measurement apparatus. As such, an embodiment of the control device of the invention may be formed by the sensor array 60 and the control device 70 as shown in FIG. 1, without the further components of the light microscope being required. Turning now to FIGS. 2 to 4, the sensor array 60 comprises a plurality of single-photon detection elements 61 which are arranged next to each other in a two-dimensional array, e.g., a hexagonal or rectangular arrangement. The single-photon counting detector elements 61 may in particular be formed as an array of SPADs (single photon avalanche diodes). Detection light impinging on the sensor array 60 forms a detection light spot 16, shown as a dashed circle. The control device is configured to individually activate or deactivate detection elements 61. Deactivated detection elements are shown in white and indicated with reference sign 63. Only activated detection elements output a measurement value (i.e., a photon count rate) which is further processed, e.g., to calculate an image of the specimen or to determine the PSF. The control device is further configured to flexibly bin or combine any number of detector elements 61 into a super-pixel. A super-pixel comprises or is connected with a multi-bit counter that outputs the accumulated photon count rates of the comprised detector elements. The number of super-pixels and the number of detector elements in each super-pixel can be flexibly set by the control device.

In the example of FIG. 2, the detector elements 62 illuminated by the detection light spot 16 are activated and not binned, resulting in thirty-seven photon count rates. It is advantageous to deactivate the considerable number of non-illuminated detector element, as shown in FIG. 2. An area of the sensor array 60 defined by the activated detector elements 62 is also referred to as an "active area".

FIG. 3 shown a case in which several activated detector elements 62 are binned into super-pixels 65. Each super-pixel 65 comprises seven detector elements 62. The super-pixels 65 are illustrated with different filling patterns (slashes, checks, diamonds, etc). Again, detector elements 63 that are not illuminated are deactivated. In FIG. 3, the detection light spot 16 is larger than in FIG. 2 and hence more detector elements 62 are activated; however, due to the binning into nineteen super-pixels 65, only nineteen photon count rates are output and hence the data rate is rather low.

As another example, FIG. 4 shows a case in which all or almost all detector elements 61 are illuminated, and are activated and binned into several super-pixels 65. This allows to reduce the data rate while still using the photon count rates of all or almost all detector elements 61.

FIG. 5 shows a case in which a detection light spot/distribution 16 illuminates a part of the detector array 60. The active area of the detector array 60 is adjusted to match the detection light spot 16. The binning pattern is set to comprise one central super-pixel 65 and several surrounding ring-shaped super-pixels 65. Ring-shaped super-pixels 65 are particularly suited if the PSF is rotationally invariant. The ring-shaped super-pixels 65 differ in their diameters. In the shown example, the thickness of each ring is defined by one layer of detector elements 61; however, alternatively outer rings may be thicker and thus comprise two or more layers of detector elements 61.

In another binning configuration shown in FIG. 6, different sized super-pixels are set. Inner super-pixels around a central point may have smaller sizes than super-pixels 65A-65D further away from the central point.

In the example of FIG. 7, the detector array 60 is split into four quadrants which constitute respective super-pixels 65A-65D. The super-pixels 65A-65D may directly border each other or may be separated by inactive detector elements 63. FIG. 8 shows a binning pattern which uses different shapes for super-pixels. An inner region is divided into several super-pixels 65C, 65D of similar sizes, e.g., several circular or hexagonal super-pixels 65C, 65D. An outer region is divided into ring-shaped super-pixels 65A, 65B. A ring-shaped super-pixel 65A may be set to have a larger thickness than a ring-shaped super-pixel 65B that is closer to a ring center.

FIG. 9 illustrates a binning pattern that may be used with a line-shaped illumination. If one or more longitudinal illumination spots are produced in a specimen plane, e.g. with one or more cylindrical lenses, then one or more longitudinal detection spots 16A, 16B may be formed on the detector array 60. In FIG. 9, a plurality of neighbouring rows (or lines) of detector elements are binned into the same super-pixel 65A or 65B. Each super-pixel 65A and 65B thus has a line shape, wherein the thickness of the line may be flexibly set. The super-pixels 65A, 65B of FIG. 9 may also be used with other illumination patterns, e.g., to select specific wavelength portions in a case in which detection light is dispersed depending on its wavelength.

FIG. 10 is to further illustrate the flexibility in the binning patterns. It is not necessary that only neighbouring detector elements are binned into the same super-pixel. Instead, a super-pixel 65B or 65C may be comprised of distanced detector elements. For example, a first super-pixel 65A may form a line, a second super-pixel 65B may be formed by two groups of detector elements that are distanced from each other, and a third super-pixel 65C may be formed by several individual detector elements that are distanced from each other. One or more of such super-pixels may be used for calibration measurements while other super-pixels are assigned to the actual specimen measurement. Correlation measurements, in particular for different specimen locations, may be carried out with super-pixels comprising distanced detector elements.

The control device 70 is configured to set binning patterns and the active area to increase the SNR, keep the data rate within acceptable boundaries and ensures a desired frame rate (which requires a limited amount of data per frame). Furthermore, the control device 70 is able to modify the size of the detection light spot 16 on the sensor array 60 and to influence the intensity distribution within the detection light spot 16. To this end, the control device 70 adjusts optical elements of the microscope. This adjustment will be first described before advantageous binning and activation patterns are explained.

Figure 1A:
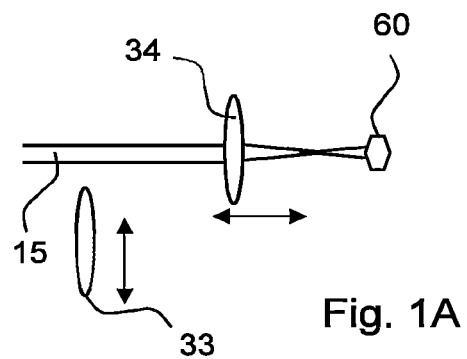

As shown in FIG. 1, optical elements 33, 34 in the beam path of the detection light 15 are adjustable to affect the detection light 15. The optical element 34 may be an imaging lens in front of the sensor array 60. It focuses the detection light 15 onto the sensor array 60, producing the detection light spot shown in FIGS. 2-4. By adjusting the optical element 34, the focus of the detection light 15 is moved relative to the sensor array 60. As a consequence, the detection light spot is out of focus and thus enlarged (shown in FIG. 1A). The optical element 34 may be shifted in the propagation direction of the detection light 15; alternatively, the optical element 34 may be an adjustable (liquid) lens that is deformed to change the focus position.

Figure 1B:
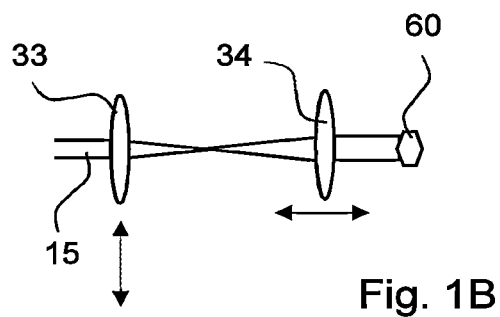

The optical element 33 may be a Bertrand lens 33. In the situations shown in FIGS. 1 and 1A, the Bertrand lens 33 is moved out of the beam path of the detection light 15. The control device may move the Bertrand lens 33 into the beam path, resulting in the case shown in FIG. 1B. The Bertrand lens 33 images a pupil plane into the plane of the sensor array 60. Adjusting the optical element 34 leads, in turn, to a change of the size of the resulting detection light spot on the sensor array 60. The detection light spot of FIG. 1B has a different and often more uniform intensity distribution than the detection light spot of FIG. 1. Furthermore, the size of the detection beam spot can be effectively varied in the case shown in FIG. 1B.

Figure 11:
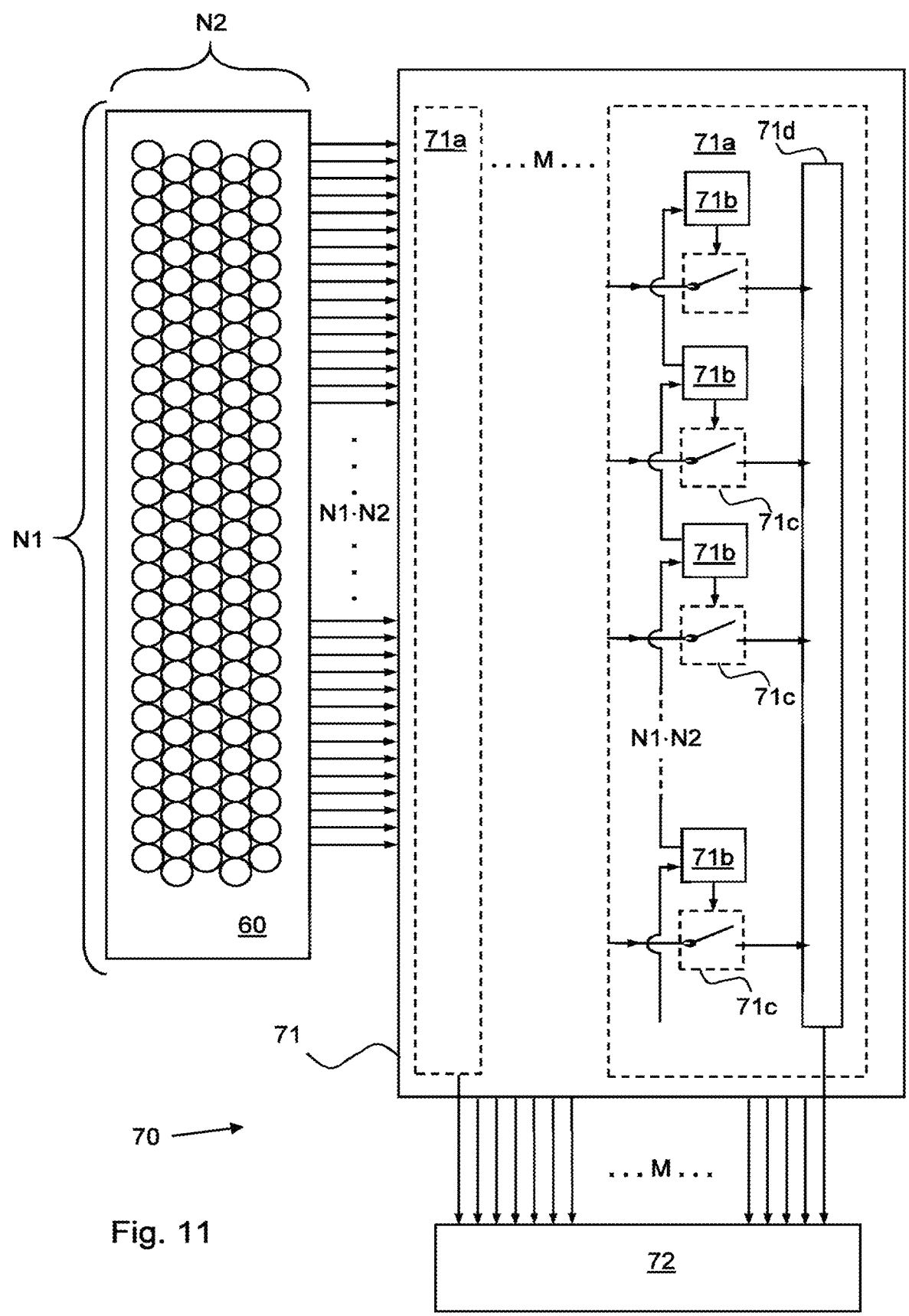
FIG. 11 shows schematically the sensor array and the control unit of a light microscope of the invention.

FIG. 11 shows schematically the architecture of the sensor array 60 and the control unit 70 of embodiments of the inventive light microscope. The sensor array 60 comprises a number of N1·N2 detector elements, and is thus configured to output a number of N1·N2 photon count rates, e.g. via respective signal lines, to a processing unit 71. The processing unit 71 is part of the control device 70 and is formed together with the sensor array 60 in the same IC or on the same circuit board. The processing unit 71 comprises a number of M individual units 71a. The design of one such unit 71a is schematically shown in FIG. 11. The remaining units 71a may be formed similarly. Unit 71a includes a combination circuit 71d to which every detector element is connected via a respective switch 71c. Each unit 71a has thus a number of N1·N2 input lines and the same number of switches 71c to flexibly control which detector elements are connected to the combination circuit 71d. The combination circuit 71d outputs a combinational signal indicative of the received signals. The combination circuit 71d may have just one output line which leads to a super-pixel counter unit 72. The combination circuit 71d may be implemented as a shared bus with pull-up or pull-down drivers controlled by the detector element outputs, as an OR function, as a XOR function or any other combinational function. Each switch 71c may be controlled through a respective memory 71b which may have one bit (indicating the "on" and "off" states of the respective switch 71c). Hence, each combination circuit 71d may comprise a number of N1·N2 one bit memories 71b. Each switch 71c may be implemented as an AND gate or a parallel PMOS+NMOS combination. The individual memory elements may be connected together to form a shift register. The output of the combination circuit 71d leads to the super-pixel counter unit 72. There are hence a number of M output lines from processing unit 71, wherein M is smaller than the product N1·N2. The super-pixel counter unit 72 comprises at least one, preferably two, multi-bit counters per combination circuit 71d. With at least one multi-bit counter for each combination circuit 71d, the super-pixel counter unit 72 is able to output a photon count rate indicative of the combined photon count rates of all detector elements that are connected through the respective switches 71c to the respective combination circuit 71d.

If the super-pixel counter unit 72 comprises two multi-bit counters per combination circuit 71d, parallel counting and readout during a dwell time become possible. That means, while one multi-bit counter is read out (and does not count further signals received and output by the respective combination circuit), another multi-bit counter connected to the same combination circuit is activated to count the signals received and output by that combination circuit. This reduces any delays in the dwell time between super-pixels due to sequential readout.

The readout of the multi-bit counters may be sequential where only a fraction of all multi-bit counters (and thus of all super-pixels) is read out to reduce the data rate.

Figure 12:
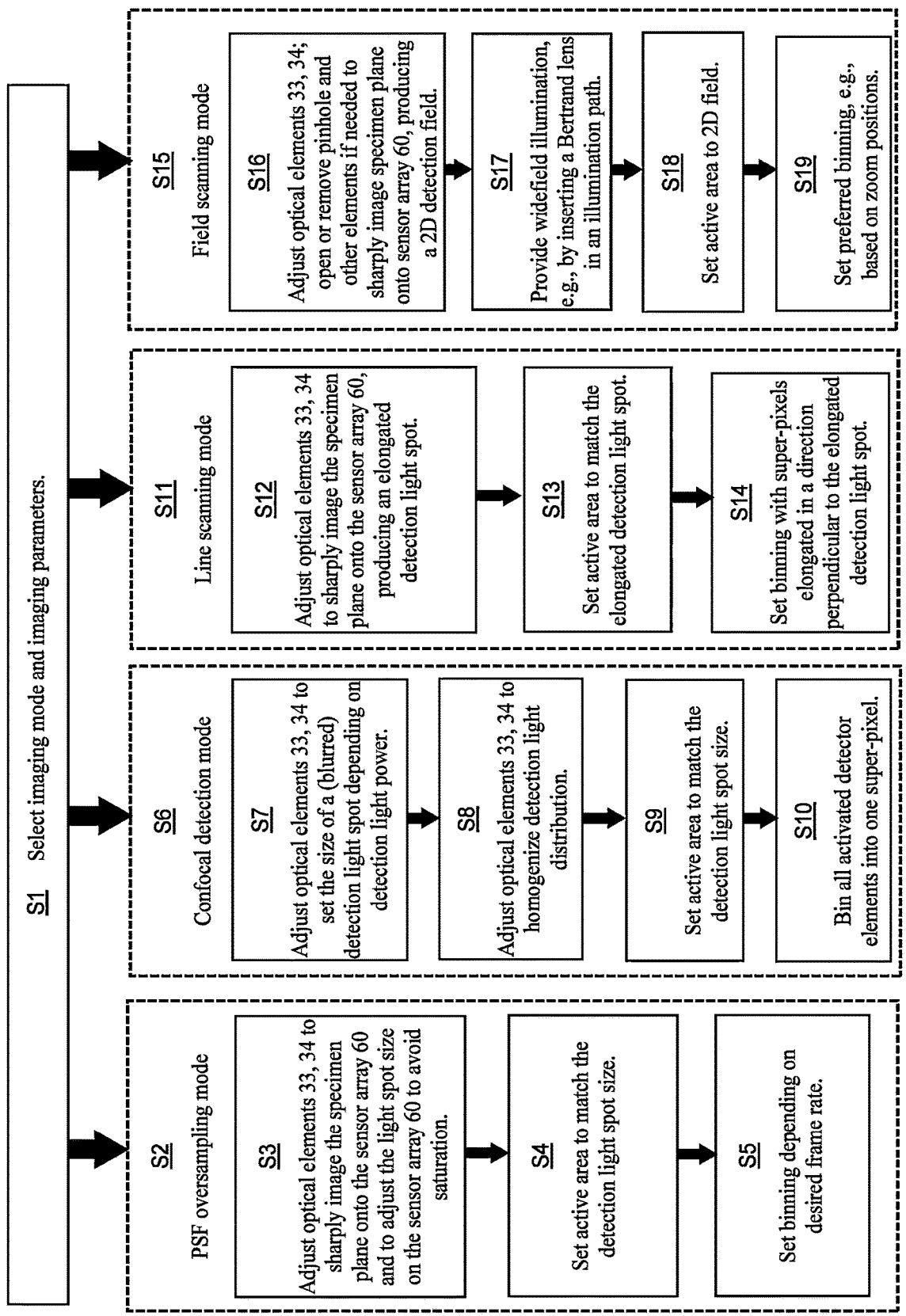
FIG. 12 shows a schematic flow chart illustrating a method of the invention.

Advantageous effects of the flexibility of the described microscope and preferred operation modes set with the control device are explained with reference to FIG. 12. FIG. 12 shows a flowchart illustrating steps of an exemplary method of the invention. Unless otherwise noted, the steps may be carried out by the control device, in particular by adjusting the above-described components (e.g., the optical elements, the light source, and the sensor array).

In step S1, a selection of imaging modes and imaging parameters is offered or displayed to a user. Depending on the user's selection, the method continues to the selected imaging mode S2, S6, S11 or S15.

If the "PSF oversampling mode" S2 is selected, the method continues to steps S3-S5. The order of these steps may vary, some or all steps may be performed simultaneously, or one or two of the steps may be omitted. In step S3, the optical elements 33, 34 are adjusted to sharply image the specimen plane onto the sensor array 60. As described above, a Bertrand lens for pupil imaging may be removed and an adjustable focusing lens may be set such that a sharp image of the specimen plane is produced on the sensor array.

The sharp image constitutes a detection light spot with a size and intensity distribution indicative of the PSF of the system. The optical elements 33, 34 are further adjusted in step S3 to adjust the detection light spot size on the sensor array 60 to a suitable size, depending on the intensity/power of the detection light beam. An excessive intensity leads to saturation of detector elements, i.e., their output photon count rate deviates from a linear relationship with the impinging photon rate or intensity. A saturation threshold may be defined as a light intensity above which the output photon count rate deviates by more than 10% from a linear relationship with the impinging light intensity. To avoid saturation, the optical elements 33, 34 are controlled to increase the detection light spot size with increasing power of the detection light beam, thus keeping the intensity per detector element below the saturation threshold. In step S4, an active area of the sensor array is set depending on the detection spot size on the sensor array. In particular, the active area may match the spot size with a deviation not larger than, e.g., 20% or 30% of the PSF size. The binning of detector elements into super-pixels is now set depending on the selected imaging parameters, e.g., the desired frame rate, step S5. The desired frame rate and the maximum bandwidth for data transmission from the control unit affect or define an upper threshold of measurement data that can be output during a pixel dwell time. The number of super-pixels is set to correspond to (or not to surpass) said upper threshold.

If the "Confocal detection mode" S6 is selected, the method continues with steps S7-S10. Again, the order of steps S7-S10 may vary, some or all steps may be performed simultaneously, and one or more of these steps may be omitted. In steps S7 and S8, the optical elements 33, 34 are adjusted to set the light spot size depending on the power or energy of the detection light beam, and to homogenize the intensity distribution over the sensor array. Decreasing the spot size means that a smaller number of detector elements is illuminated with a larger intensity or light power. For low intensities, the dark noise of a detector element is significant and hence it may increase the SNR if the spot size is reduced. For large intensities, in contrast, a detector element may saturate (its output photon count rate no longer linearly depends on the impinging intensity; furthermore, the total SNR is deteriorated). Therefore, for large intensities the spot size is increased to avoid excessive high intensities on the detector elements. The control device may thus use a predefined function which calculates a spot size to be set in dependence of a light beam power or energy (which is calculated or previously measured). With increasing intensity, the function outputs an increasing spot size to be set. In the confocal detection mode, merely the total output from the detector elements is relevant whereas the intensity distribution over the detector elements is not analysed. Hence, the intensity distribution over the detector elements may be influenced to meet other criteria: In particular, to avoid saturation of some detector elements due to excessive intensities, the optical elements 33, 34 are adjusted to make the intensity distribution more even. A sharp image on the sensor array is not required as no spatial information from individual detector elements is used. As explained further above, a focusing lens 34 may thus be adjusted to change the spot size, and a Bertrand lens 33 may optionally be used to produce a pupil image (which may have a more even intensity distribution) and influence the spot size. In contrast to zoom optics, which allow to adjust the spot size while preserving a sharp imaging, the adjustment with just two optical elements 33, 34 is significantly less complex, leading to a potentially reduced loss of light and lower costs. Use of such simplified optics becomes possible because of the flexibility offered by the SPAD sensor array 60. The above-described steps S7 and S8 may be carried out as one step. In the following step S9, the active area is set to match the light spot size on the sensor array. Alternatively, the active area may be set to a size larger than the light spot size, e.g., by a margin of up to 20% of the light spot size. In simpler variants, all detector elements may be activated. In step S10, all activated detector elements are binned into the same super-pixel. Hence, the output value of the super-pixel is the combined photon count rate of all activated detector elements. This procedure reduces the data rate while no information relevant for confocal imaging is lost.

If the "Line scanning mode" S11 is selected, the method continues with steps S12-S14. Again, the order of steps S12-S14 may vary, some or all steps may be performed simultaneously, or one or more of these steps may be omitted. In the lines scanning mode, optics in the illumination beam path are adjusted to provide an illumination line in a specimen plane to be examined. For example, a cylinder lens may be inserted into the illumination beam path. In step S12, the optical elements 33, 34 are adjusted to sharply image the specimen plane onto the sensor array. As a line or elongated area of the specimen is illuminated, detection light is emitted from this illuminated specimen area and leads to an elongated or line-shaped detection light spot on the sensor array. In step S13, the active area is set depending on the elongated detection light spot such that at least some non-illuminated detector elements are deactivated. In particular, only illuminated detector elements are activated. Step S14 sets the binning pattern. Detector elements next to each other in a direction perpendicular to the longitudinal direction of the elongated detection light spot are binned into the same super-pixel, respectively. In contrast, detector elements next to each other in the longitudinal direction are not binned into the same super-pixel (or alternatively only two or three neighbouring detector elements in the longitudinal direction are binned together to further increase the frame rate, on cost of the resolution).

If the "field scanning/imaging mode" S15 is selected, the method continues with steps S16-S19. In step S16, optical elements are adjusted to sharply image the specimen plane onto the sensor array. In step S17, a widefield illumination is set, in contrast to, e.g., the PSF oversampling mode S2 or the confocal detection mode S6 in which the illumination is set such that only a specimen point is illuminated. Next, in step S18 the active area is set to correspond to the illuminated area on the sensor array, which may depend on the currently inserted objective, the widefield illumination size or a zoom setting. In step S19, a binning pattern is set which may be chosen, for example, depending on a current zoom position.

In variants of the above-described method, other optical elements than the optical elements 33, 34 may be provided and adjusted to change the spot size and/or light distribution. Further variants may offer additional imaging modes or not all of the three described imaging modes.

The inventive method, detector and light microscope provide a particularly good imaging quality, and simultaneously a large flexibility without the need of complex and cost-intensive zoom optics.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

LIST OF REFERENCE SIGNS 10 light source
12 illumination light
12A, 12B beam paths of illumination light 12
15 detection light
16, 16A, 16B detection light spot (size)/PSF on sensor array 60
18 pinhole
22 beam splitter
23, 24 optical elements
25 scanner
30 objective
31, 32 optical elements
33 optical element, Bertrand lens
34 optical element, adjustable lens
35 specimen
60 sensor array
61 photon-counting detector elements
62 activated photon-counting detector elements
63 deactivated photon-counting detector elements
65, 65A-65D super-pixels
70 control device
71 processing unit of control device 70
71a unit of processing unit 71
71b memory of unit 71a
71c switch of unit 71a
71d combination circuit of unit 71a
100 light microscope
N1·N2 number of detector elements 61; number of input lines to processing unit 71
M number of units 71a; number output lines of processing unit 71
S1-S19 method steps

What is claimed is:

1. A light microscope comprising:
a light source for illuminating a specimen;
a sensor array including photon-counting detector elements for measuring detection light coming from the specimen; and
a control device for controlling the sensor array, wherein the control device or parts of the control device and the sensor array are built in the same integrated circuit, with multi-bit counters formed as on-chip multi-bit counters;
wherein
the control device is configured for flexibly binning the photon-counting detector elements into one or more super-pixels, wherein outputs of all photon-counting detector elements binned into the same super-pixel are combined into a common output line:
the control device is configured to assign a respective one of the multi-bit counters to each super-pixel, wherein each of the multi-bit counters outputs a cumulative number indicative of counted photons by all photon-counting detector elements binned into the respective super-pixel.

2. The light microscope according to claim 1, wherein the control device is configured to variably set the number of super-pixels, and to variably set the number of photon-counting detector elements binned into one super-pixel.

3. The light microscope according to claim 1, wherein the control device or parts of the control device and the sensor array are built on the same circuit board or in the same integrated circuit,
each photon-counting detector element is connected via a respective signal line to the control device, and
the control device is configured to assign a respective multi-bit counter to each super-pixel.

4. The light microscope according to claim 1, further comprising adjustable optical elements for adjusting a spot size of detection light on the sensor array,
wherein the control device is configured to
adjust an active area of the sensor array,
control the optical elements to decrease a detection light spot size on the sensor array
and decrease the active area of the sensor array with decreasing power of the detection light, wherein the control device is configured to set the binning and the active area of the sensor array according to information on the detection light spot size.

5. The light microscope according to claim 1, wherein the control device is configured to increase an active area of the sensor array and increase an average number of photon-counting detector elements per super-pixel in dependence of one or more of the following: (a) with increasing illumination wavelength, (b) when a currently used objective is exchanged for an objective with smaller back aperture, and vice versa, and (c) depending on a numerical aperture.

6. The light microscope according to claim 1,
wherein the control device is configured for a PSF oversampling mode, in which one or more of the following applies:
an active area of the sensor array is set in dependence of a PSF size on the sensor array,
the number of super-pixels is set in dependence of the PSF size, and
the number of photon-counting detector elements binned into the same super-pixel is set in dependence of a desired maximum count rate.

7. The light microscope according to claim 6,
wherein the control device is configured to increase, in the PSF oversampling mode, the number of photon-counting detector elements binned into the same super-pixel with increasing PSF size such that a data rate output by the control device does not exceed a predefined maximum rate or is constant.

8. The light microscope according to claim 6,
wherein the control device is configured to set, in the PSF oversampling mode, the super-pixels such that a center-to-center distance between neighbouring super-pixels is at most 0.2 Airy disc diameters, and
wherein the control device is configured for offering a plurality of imaging modes to a user,
wherein the imaging modes comprise at least two of: the PSF oversampling mode, a confocal detection mode, a line or array scanning mode, and a field imaging mode,
and wherein the control device is configured for setting the binning of the photon-counting detector elements depending on a selected imaging mode.

9. The light microscope according to claim 6,
wherein the control device is configured to, in the PSF oversampling mode or a confocal detection mode, adjust a detection light spot size on the detector array based on an impinging light intensity to avoid saturation of the photon-counting detector elements and to increase SNR.

10. The light microscope according to claim 8, wherein the control device is configured to adjust optical elements of the light microscope dependent on the selected imaging mode:
in the confocal detection mode, the optical elements are adjusted to homogenize an intensity distribution on the sensor array, by setting a pupil imaging onto the sensor array and adjusting a detection light spot size on the sensor array;
in the PSF oversampling mode, the optical elements are adjusted to image a specimen point onto the sensor array to record spatial information on a PSF,
one of the optical elements is a Bertrand lens, another of the optical elements is an imaging lens, and the control device is configured to set a pupil imaging by inserting the Bertrand lens into a beam path of the detection light, and the control device is configured to adjust the detection light spot size by adapting a focal length of the imaging lens which focuses the detection light into the vicinity of the sensor array.

11. The light microscope according to claim 1,
wherein the control device is configured for a line scanning mode in which
the specimen is illuminated with an elongated illumination light beam, leading to an elongated detection light spot on the sensor array, and
the control device bins photon-counting detector elements together such that elongated super-pixels are formed in a direction perpendicular to the elongated detection light spot.

12. The light microscope according to claim 1, wherein the control device is configured for a confocal detection mode in which all activated photon-counting detector elements are binned into one super-pixel, or
wherein the control device is configured for an array scanning mode in which the specimen is illuminated with a plurality of illumination spots, and the active area and the binning of the photon-counting detector elements are set depending on the set illumination.

13. The light microscope according to claim 1, wherein the control device is configured
to prompt a user to enter a desired frame rate, and
to adjust the binning and active area of the sensor array to limit a resulting data rate depending on the desired frame rate, or
wherein the control device is configured to keep an output data rate constant by adjusting the binning when an active area of the sensor array is changed.

14. The light microscope according to claim 1, wherein for providing a maximum number of M flexibly settable super-pixels, the control device comprises a processing unit with a number of M units, wherein each unit comprises a respective combination circuit with which the photon-counting detector elements are connected through programmable switches, wherein each combination circuit outputs a signal stream indicative of the joint photon count rates of all detector elements for which the respective switches to the combination circuit are closed.

15. The light microscope according to claim 14, wherein the control device comprises a super-pixel counter unit with a number of M input lines each connected to a respective output of the combination circuits,
each of the M input lines leads respectively to at least one multi-bit counter of the super-pixel counter unit,
the super-pixel counter unit comprises two multi-bit counters per combination circuit, wherein each of the M input lines leads to a pair of multi-bit counters, wherein one of the pair of multi-bit counters is read out while the other of the multi-bit counters counts incoming photon count rates.

16. The light microscope according to claim 1, wherein
the control device is configured to adjust a timing delay between output data streams of different super-pixels, based on a calibration matrix,
the light microscope further comprising a scanner configured to scan the specimen with the illumination light and to direct the detection light towards the sensor array, wherein the control device is configured to adjust the binning during the scan based on information acquired during the same scan.

17. The light microscope according to claim 1,
wherein the control device is configured to set different sensitivities between the photon-counting detector elements of the same super-pixel.

18. A light detector comprising:
a sensor array including photon-counting detector elements; and
a control device for controlling the sensor array;
wherein
the control device is configured for flexibly binning the photon-counting detector elements into one or more super-pixels, wherein outputs of all photon-counting detector elements binned into the same super-pixel are combined into a common output line; and
the control device is configured to adjust the binning and active area of the sensor array to limit a resulting data rate depending on an imaging parameter.

19. The light detector according to claim 18, further comprising event-driven active recharge components for each photon-counting detector element, wherein the control device is configured for flexibly binning contiguous or non-contiguous photon-counting detector elements into the same super-pixel.

20. An imaging method, comprising:
illuminating a specimen with illumination light;
measuring detection light coming from the specimen with a sensor array comprised of photon-counting detector elements;
controlling the sensor array with a control device;
flexibly binning the photon-counting detector elements into one or more super-pixels in a same integrated circuit with the sensor array-, thus combining outputs of all photon-counting detector elements which are binned into the same super-pixel into a common output line; and
assigning, to each super-pixel a respective multi-bit counter out of a plurality of multi-bit counters which are formed as on-chip multi-bit counters, wherein each of the plurality of multi-bit counters outputs a cumulative number indicative of photons counted by all photon-counting detector elements binned into the respective super-pixel.

* * * * *

UNITED STATES PATENT AND TRADEMARK OFFICE
CERTIFICATE OF CORRECTION

PATENT NO. : 12,204,082 B2
APPLICATION NO. : 17/602086
DATED : January 21, 2025
INVENTOR(S) : Tiemo Anhut et al.

It is certified that error appears in the above-identified patent and that said Letters Patent is hereby corrected as shown below:

In the Claims

Column 19, Line 62 (Claim 1):
Now reads: "a common output line:"
Should read: -- a common output line; --

Column 22, Line 53 (Claim 20):
Now reads: "the sensor array-, thus combining outputs of all photon-"
Should read: -- the sensor array, thus combining outputs of all photon- --

Column 22, Line 57 (Claim 20):
Now reads: "assigning, to each super-pixel a respective multi-bit coun-"
Should read: -- assigning, to each super-pixel, a respective multi-bit coun- --

Signed and Sealed this
Twenty-fifth Day of March, 2025

Coke Morgan Stewart
*Acting Director of the United States Patent and Trademark Office*